United States Patent
Castellucci et al.

(10) Patent No.: US 10,798,883 B2
(45) Date of Patent: Oct. 13, 2020

(54) PLANT WEED PREVENTER ENHANCING WATER AND HEAT RETENTION

(71) Applicants: Nicholas T Castellucci, McKeesport, PA (US); John Edward Aiken, Monroeville, PA (US)

(72) Inventors: Nicholas T Castellucci, McKeesport, PA (US); John Edward Aiken, Monroeville, PA (US)

( * ) Notice: Subject to any disclaimer, the term of this patent is extended or adjusted under 35 U.S.C. 154(b) by 249 days.

(21) Appl. No.: 15/015,719

(22) Filed: Feb. 4, 2016

(65) Prior Publication Data

US 2017/0223906 A1 Aug. 10, 2017

(51) Int. Cl.
*A01G 13/02* (2006.01)
*A01M 21/00* (2006.01)

(52) U.S. Cl.
CPC ......... *A01G 13/0281* (2013.01); *A01M 21/00* (2013.01)

(58) Field of Classification Search
CPC ............ A01G 13/0281; A01G 13/0256; A01G 13/02; A01G 13/0237; A01G 13/04; A01G 1/08
See application file for complete search history.

(56) References Cited

U.S. PATENT DOCUMENTS

| | | | | |
|---|---|---|---|---|
| 80,012 A * | 7/1868 | Robbins | ............. | A01G 13/0281 47/32 |
| 2,949,698 A | 8/1960 | Downey et al. | | |
| 3,005,287 A * | 10/1961 | Dudley | ............. | A01G 13/0281 405/36 |
| 3,287,851 A * | 11/1966 | Cramer | ............. | A01G 13/0281 47/32 |
| 3,305,969 A * | 2/1967 | Mattson | ............. | A01G 13/0281 47/32 |
| 3,704,004 A | 11/1972 | Carter, Jr. | | |
| 4,308,688 A * | 1/1982 | Revane | ................... | E01C 9/005 47/32 |
| D299,409 S * | 1/1989 | Inglis | ................. | D8/1 |
| 5,709,049 A * | 1/1998 | Baird | ................. | A01G 13/0281 47/21.1 |
| 6,976,334 B1 * | 12/2005 | Bowditch | .......... | A01G 13/0281 47/29.1 |
| 2014/0325903 A1 | 11/2014 | Thompson | | |

FOREIGN PATENT DOCUMENTS

| | | | | |
|---|---|---|---|---|
| CH | 462525 A * | 9/1968 | ......... | A01G 13/0281 |
| DE | 2118947 A1 * | 1/1973 | ......... | A01G 13/0281 |
| DE | 9211594 U1 * | 1/1994 | ......... | A01G 13/0281 |
| FR | 2129266 A5 * | 10/1972 | ......... | A01G 13/0281 |
| FR | 2146516 A5 * | 3/1973 | ......... | A01G 13/0281 |

* cited by examiner

*Primary Examiner* — Kristen C Hayes

(57) ABSTRACT

A substantially rectangular and open bottom shield configured to be fitted around an in-ground plant at ground level as enabled by an elongated slit and central aperture. A peripheral wall perpendicular to an opaque top panel extends downward around at least 75% of the perimeter of the top panel. The top panel is inclined toward the central aperture through which water and fertilizer can flow toward the plant root system.

1 Claim, 3 Drawing Sheets

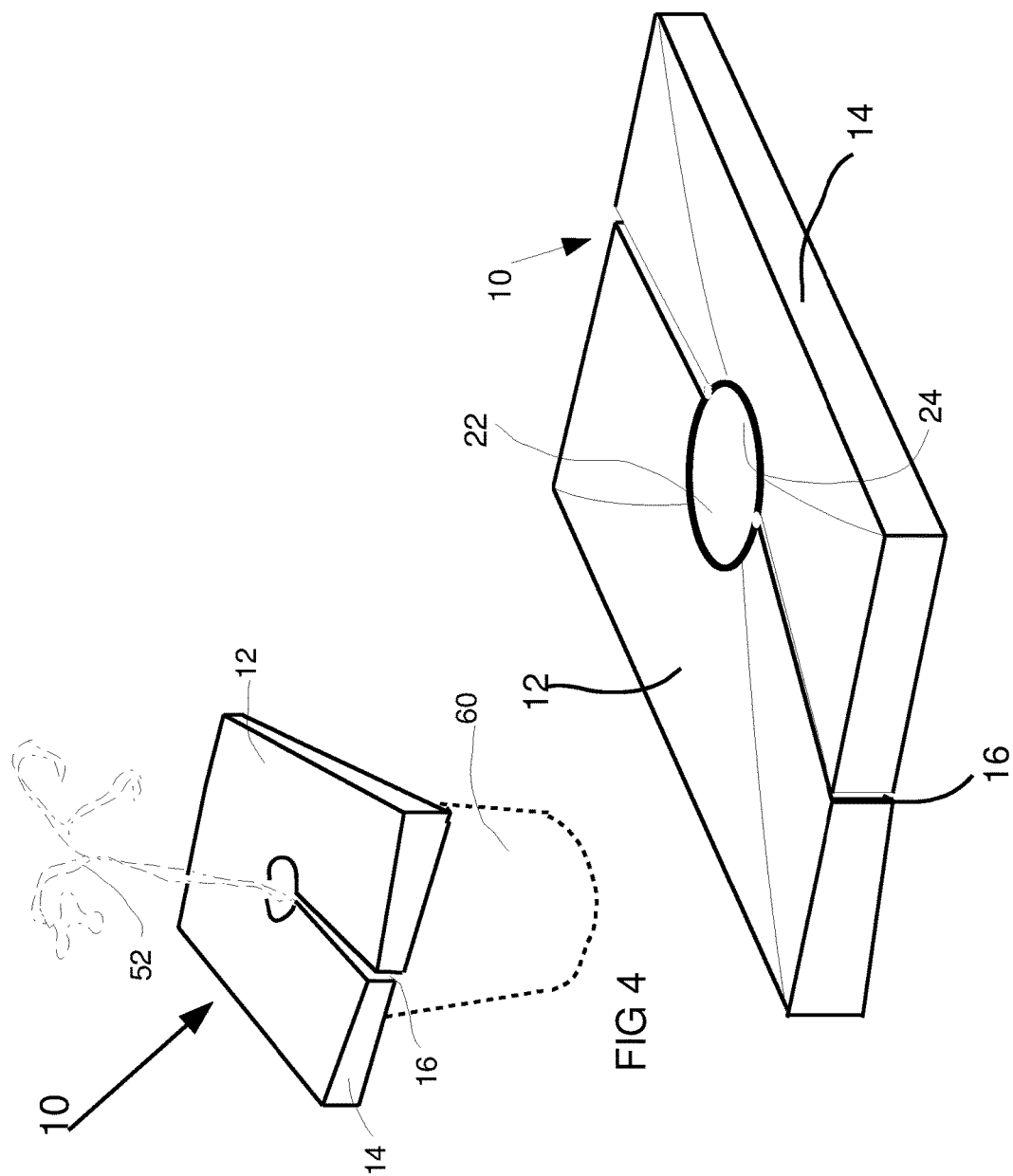

PLANT WEED PREVENTER ENHANCING WATER AND HEAT RETENTION

CROSS REFERENCE TO RELATED APPLICATION

This patent application is related to and claims priority from U.S. Provisional Patent Application Ser. No. 62/113,026 filed Feb. 6, 2015.

FIELD OF THE INVENTION

The present invention relates, in general, to enhanced outdoor plant growing and, more particularly, this invention relates to a ground level concave weed-preventing shield covering a portion of the root area of an outdoor plant.

BACKGROUND OF THE INVENTION

Prior to the conception and development of the present invention, the area surrounding plants such as tomatoes have been prone to competing weed growth, and the plants do not grow as well in an environment that is cool, dry, and lacking nutrients. Mulch mats and tree mats are commercially available and appear similar superficially, but are somewhat expensive, especially if a considerable number are wanted. Also, they are generally circular and permeable to water.

Prior art patents such as U.S. Pat. No. 3,305,969 to Mattson disclose a circular plant protector collar with a slot from the outer perimeter to a central orifice. The '969 patent teaches a device having a flat bottom and a concave upper surface. The flat bottom does not grip the soil and permits sliding around, especially in heavy rain. Also, much more material is required to make it and multiple units are not amenable to nesting for storage. U.S. Pat. No. 2,949,698 discloses a porous mulch pad with flat top and bottom. In U.S. Pat. No. 3,704,004, Carter teaches a flat collar for surrounding a post. This type will leave puddles of water that can attract mosquitoes. U.S. Patent Application 2014/0325903 discloses an embedded plant collar that is mostly down in the soil with a flat flange around the top edge. All four patents or applications are for devices primarily to prevent vegetation growth in the covered area. Except for Mattson, they do not address funneling water and fertilizer, nor heat and water retention. In addition, all but Carter are circular and would not significantly increase water collection area if placed on top of a circular growing container. Carter would droop over the sides and also not increase water collection.

SUMMARY OF THE INVENTION

The present invention provides a substantially rectangular and low-profile impermeable opaque shield that can be fitted around an in-ground plant at ground level as enabled by a keyhole-like slot and center aperture. An edge normal to a top panel extends downward around most of the perimeter. The top panel is generally concave and inclined toward the central aperture.

In a less-preferred alternative embodiment, the apparatus is split into two substantially identical halves that slide around a plant stem and interlock or abut to cover an area around a plant stem or plants in a row with a central indentation.

OBJECTS OF THE INVENTION

It is, therefore, one of the primary objects of the present invention to provide a durable, attractive and inexpensive device that substantially surrounds an in-ground plant and enhances plant growth in numerous ways while inhibiting weeds.

Another object of the present invention by virtue of its impervious and dark-colored top is to maintain a warmer and moister environment around a plant and its roots than would otherwise be there.

Still another object of the present invention is to provide a simple low-cost reusable apparatus that, whether one piece or cut into two, readily slips around an existing plant stem and eliminates weed growth in the substantial covered area.

Yet another object of the present invention is to provide a multitude of durable low-maintenance ground-gripping weed shields that can be used year after year and nest together for compact storage.

An additional objective is to the channel rainwater in toward the plant root system, especially when used with a potted-plant container wherein the shield covers much more area than the top of the container.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures.

BRIEF DESCRIPTION OF THE DRAWINGS

FIG. 4 illustrates the preferred embodiment in a perspective view in use around a plant in a container.

FIG. 5 provides a perspective view of a two-piece alternative embodiment of the invention.

Figure 1:
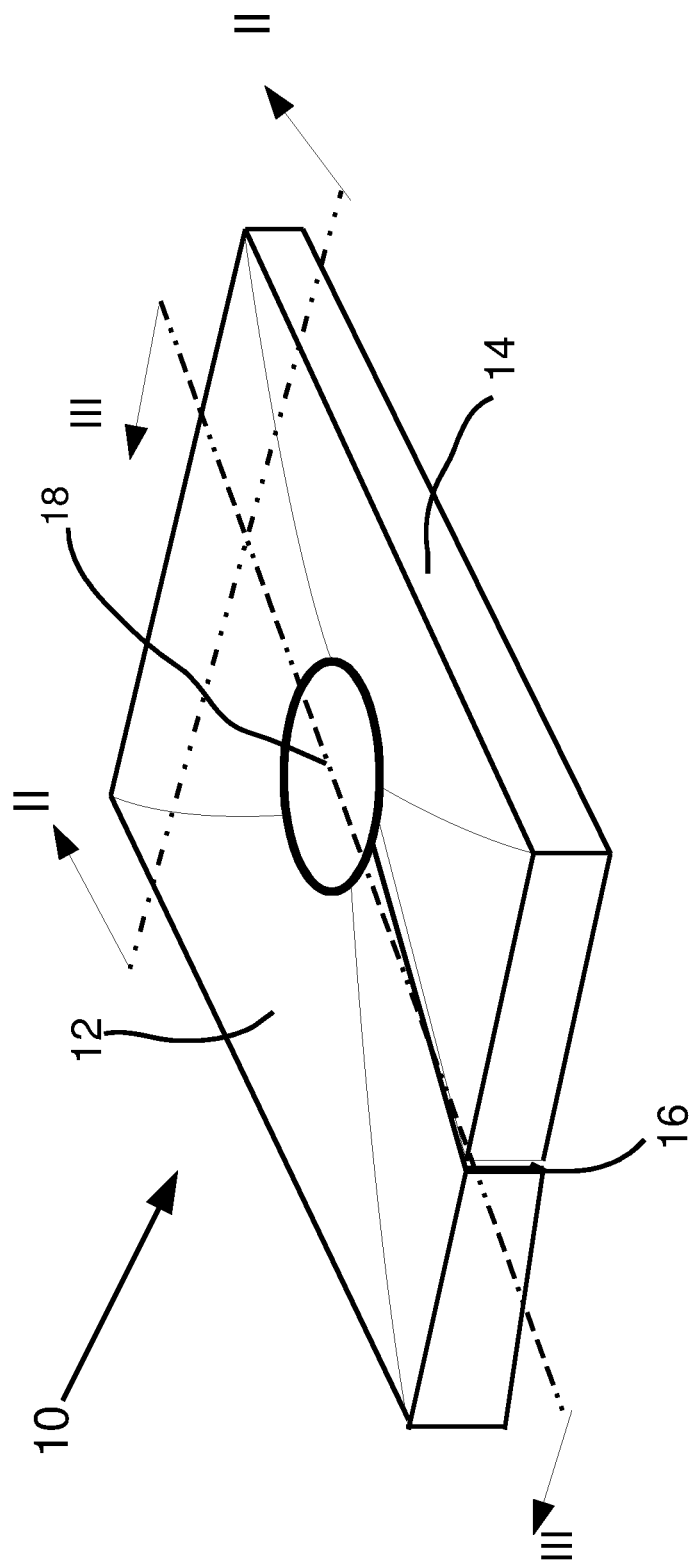
FIG. 1 provides a perspective view of a preferred embodiment of the present invention.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Referring initially to FIG. 1, this provides a perspective view of a preferred embodiment of a plant shield apparatus generally indicated by 10. A low-profile generally planar opaque top panel 12 has at least three elongated peripheral walls 14 extending downward, and which are substantially perpendicular to the top panel 12 and surround at least 75% of the top panel. The top panel 12 must be opaque to keep out light and inhibit weed growth underneath, and solid black, dark green, and brown are preferred colors. The rectangular top panel 12 is substantially concave in that it generally slopes slightly toward the center such that nearly all rain water landing on it will be directed toward the plant stem and adjacent roots. Sloping slightly and generally concave is characterized by that which will not allow water to pool on the top surface as viewed from above when in position for use, yet the average slope is less than 10%. A generally central aperture 18 and slit 16 form a keyhole-like opening configured to slip the apparatus 10 around an in-ground plant (not shown) by flexing the top panel sections adjacent the slit in opposite vertical directions. The aperture 18 is typically about 5 cm (2 inches) diameter and the slit 16 just a cut through. The slit 16 cuts through one side edge 21, which may or may not be tapered. Typically, the top panel is square and in the range of 30 to 60 cm (12 to 24 inches) per side. It is also substantially impervious, meaning that over 90 percent of the top area would not allow liquid to pass directly through. This feature is significant in that it minimizes water evaporation and also impedes weed growth and funnels water toward the center.

Figure 2:
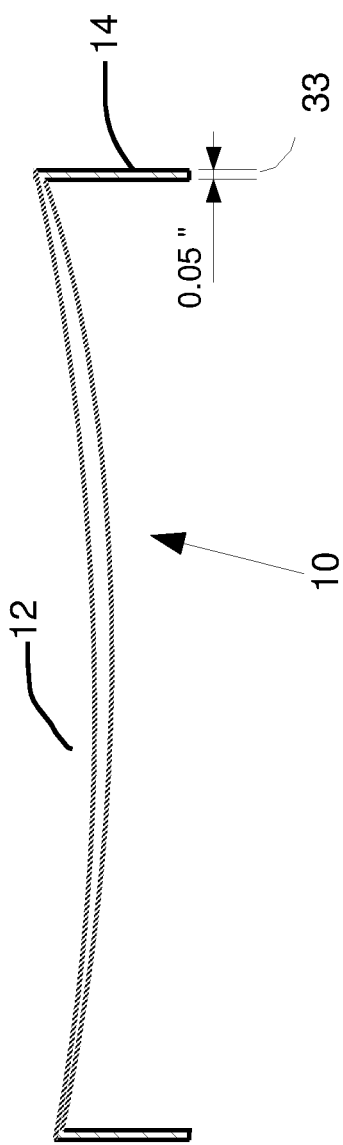
FIG. 2 is a sectional view along the plane of cut line II-II in FIG. 1.

FIG. 2 is a sectional view along the plane of cut line II-II in FIG. 1. The top panel 12 generally slopes inwardly away from the outer wall edges 14. The thickness of the top panel 12 and peripheral walls 14 will typically be between 2 and 6 mm. This thickness is for reasons of cost, being bendable, and also such that the wall edge 14 can be forced slightly into the ground to help hold it in place. The underside of panel 12 will generally be elevated enough to avoid ground contact and serve as a condensation surface for water that may evaporate during the heat of the day.

Figure 3:
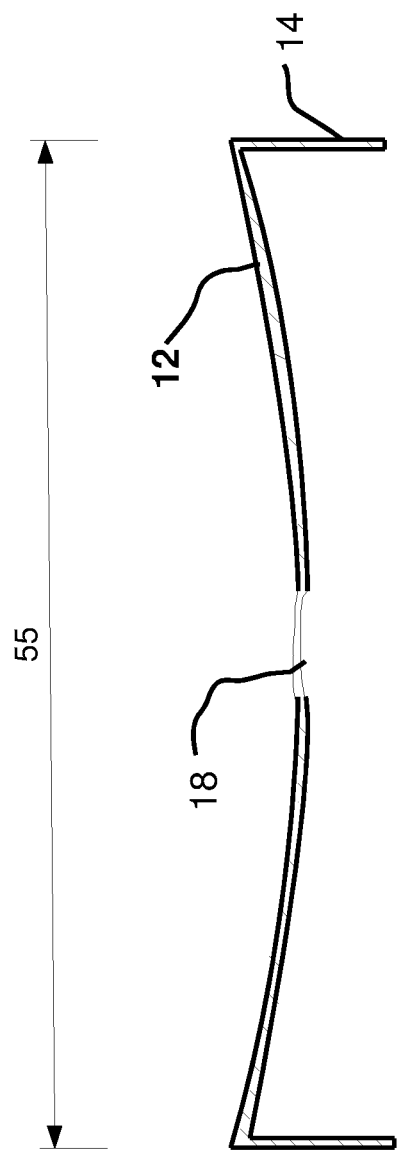
FIG. 3 is an alternate sectional view along the plane of cut line III-III in FIG. 1.

FIG. 3 is an alternate sectional view along the plane of cut line III-III in FIG. 1, which passes through the aperture 18 and slot 16. The top panel width and length dimensions 55 are typically in the range of 30 to 60 centimeters (12 to 24 inches). The elongated peripheral wall sections 14 serve to engage the soil to inhibit sliding and yet create a hollow underside with an air space under the opaque top panel to keep the soil warmer around the plant. The effect of the present invention is to keep the soil underneath about 4 to 7 degrees Celsius warmer at a depth of about 6 inches (15 cm).

FIG. 4 Illustrates, in a perspective view, use of the single-piece preferred embodiment 10 on top of a potted-plant container 60 for acting as a low-profile funnel with the sloped top panel 12 configured to collect and direct more rainwater or sprinkler water than would otherwise be taken in. For instance, a 12-inch round top on a typical pail offers only 114 square inches of area for rain to land on, while a 20-inch square shield offers 400 square inches, more than triple the water-catching area. The slit 16 allows the shield 10 to fit around an existing plant 52 and the edge wall 14 protrudes downward outside the top perimeter of the plant container 60.

FIG. 5 provides a perspective view of a two-piece alternative embodiment of the invention generally shown as 10. The slit 15 has been extended entirely across the top panel 12 thus splitting it into two identical halves with semicircle indentations 22 and 24 in lieu of a central aperture. The two halves can then be placed individually adjacent a row of plants or a single one with the two edges of the slit 16 nearly abutting and covering an area on both sides to inhibit weed growth and direct water toward the plant roots. Given how easy it is to extend the slit by cutting, this is deemed to be a minor variant within the scope of the preferred embodiment.

While a presently preferred and an alternative embodiments of the present invention have been described in sufficient detail above, and in the attached claims, to enable a person skilled in the relevant art to make and use the same, it should be obvious that various other adaptations and modifications can be envisioned by those persons skilled in such art without departing from the spirit of the invention.

We claim:

1. A weed-preventing and water-funneling plant shield comprising;
    a) a generally rectangular hollow bottom structure having
        i.) a concave opaque top panel having a predetermined width, length and thickness, said concave top panel sloped at less than 10 percent toward a central aperture;
        ii.) an elongated integral peripheral wall portion substantially perpendicular to said top panel and extending in direction of concavity and providing a predetermined height; and
    b) an elongated slit in said top panel extending from said central aperture to and through an edge of said top panel and configured so as to allow portions of said top panel adjacent said elongated slit to be flexed vertically for fitting around a plant stem at said central aperture.

* * * * *